US011022434B2

(12) United States Patent
Bauer et al.

(10) Patent No.: US 11,022,434 B2
(45) Date of Patent: Jun. 1, 2021

(54) THERMAL MANAGEMENT OF AN OPTICAL SCANNING DEVICE

(71) Applicant: HEXAGON METROLOGY, INC., North Kingstown, RI (US)

(72) Inventors: Tom Bauer, Vista, CA (US); Gerald Gerent, Vista, CA (US); David Demiter, Encinitas, CA (US)

(73) Assignee: HEXAGON METROLOGY, INC., North Kingstown, RI (US)

( * ) Notice: Subject to any disclaimer, the term of this patent is extended or adjusted under 35 U.S.C. 154(b) by 65 days.

(21) Appl. No.: 16/188,927

(22) Filed: Nov. 13, 2018

(65) Prior Publication Data
US 2020/0025558 A1 Jan. 23, 2020

Related U.S. Application Data

(60) Provisional application No. 62/585,394, filed on Nov. 13, 2017.

(51) Int. Cl.
G01B 11/25 (2006.01)
G01B 5/00 (2006.01)
G01B 5/004 (2006.01)
G01B 11/14 (2006.01)
G01B 21/04 (2006.01)
G06T 7/60 (2017.01)
H04N 1/024 (2006.01)

(52) U.S. Cl.
CPC .......... *G01B 11/2513* (2013.01); *G01B 5/004* (2013.01); *G01B 5/0014* (2013.01); *G01B 11/14* (2013.01); *G01B 21/04* (2013.01); *G06T 7/60* (2013.01); *H04N 1/02481* (2013.01)

(58) Field of Classification Search
CPC .... G01B 11/14; G01B 11/2513; G01B 21/04; G01B 11/2518; G01B 5/0014; G01B 5/004; G06T 7/60; H04N 1/02481; G02B 26/10; G02B 27/0031
See application file for complete search history.

(56) References Cited

U.S. PATENT DOCUMENTS

| 4,474,064 A | 10/1984 | Naruse et al. |
| 4,972,090 A | 11/1990 | Eaton |
| 5,129,044 A | 7/1992 | Kashiwagi et al. |
| 5,412,880 A | 5/1995 | Raab |

(Continued)

FOREIGN PATENT DOCUMENTS

| EP | 0 266 070 | 5/1988 |
| EP | 1 650 530 | 4/2006 |

(Continued)

OTHER PUBLICATIONS

International Search Report and Written Opinion dated Apr. 15, 2019, in International Application No. PCT/US2018/060664, 19 pages.

(Continued)

*Primary Examiner* — Hina F Ayub
(74) *Attorney, Agent, or Firm* — Knobbe, Martens, Olson & Bear, LLP

(57) ABSTRACT

Thermal variations on an optical scanning device can affect measurements made by that device. Various ways are presented here to control the temperature of a device and compensate for temperature variations of the device.

41 Claims, 10 Drawing Sheets

(56) References Cited

U.S. PATENT DOCUMENTS

| | | |
|---|---|---|
| 5,424,835 A | 6/1995 | Cosnard et al. |
| 5,528,505 A | 6/1996 | Granger et al. |
| 5,757,499 A | 5/1998 | Eaton |
| 5,829,148 A | 11/1998 | Eaton |
| 6,023,637 A * | 2/2000 | Liu ................... A61B 5/015 128/922 |
| 6,598,306 B2 | 7/2003 | Eaton |
| 6,817,108 B2 | 11/2004 | Eaton |
| 7,003,892 B2 | 2/2006 | Eaton et al. |
| 5,829,148 C1 | 6/2006 | Eaton |
| 7,152,456 B2 | 12/2006 | Eaton |
| 7,246,030 B2 | 7/2007 | Raab et al. |
| 5,829,148 C2 | 5/2008 | Eaton |
| 7,441,341 B2 | 10/2008 | Eaton |
| 7,519,493 B2 | 4/2009 | Atwell et al. |
| 7,525,276 B2 | 4/2009 | Eaton |
| 7,546,689 B2 | 6/2009 | Ferrari et al. |
| 7,568,293 B2 | 8/2009 | Ferrari |
| 7,578,069 B2 | 8/2009 | Eaton |
| D599,226 S | 9/2009 | Gerent et al. |
| 7,624,510 B2 | 12/2009 | Ferrari |
| 7,640,674 B2 | 1/2010 | Ferrari et al. |
| D610,926 S | 3/2010 | Gerent et al. |
| 7,693,325 B2 | 4/2010 | Pulla et al. |
| 7,743,524 B2 | 6/2010 | Eaton et al. |
| 7,774,949 B2 | 8/2010 | Ferrari |
| 7,779,548 B2 | 8/2010 | Ferrari |
| 7,805,854 B2 | 10/2010 | Eaton |
| 7,908,757 B2 | 3/2011 | Ferrari |
| 7,984,558 B2 | 7/2011 | Ferrari |
| D643,319 S | 8/2011 | Ferrari et al. |
| 8,015,721 B2 | 9/2011 | Eaton et al. |
| 8,082,673 B2 | 12/2011 | Desforges et al. |
| 8,099,877 B2 | 1/2012 | Champ |
| 8,104,189 B2 | 1/2012 | Tait |
| 8,112,896 B2 | 2/2012 | Ferrari et al. |
| 8,122,610 B2 | 2/2012 | Tait et al. |
| 8,123,350 B2 | 2/2012 | Cannell et al. |
| 8,127,458 B1 | 3/2012 | Ferrari |
| 8,151,477 B2 | 4/2012 | Tait |
| D659,035 S | 5/2012 | Ferrari et al. |
| 8,176,646 B2 | 5/2012 | Ferrari |
| 8,201,341 B2 | 6/2012 | Ferrari |
| 8,220,173 B2 | 7/2012 | Tait |
| 8,229,208 B2 | 7/2012 | Pulla et al. |
| 8,284,407 B2 | 10/2012 | Briggs et al. |
| 8,327,555 B2 | 12/2012 | Champ |
| 8,336,220 B2 | 12/2012 | Eaton et al. |
| 8,402,669 B2 | 3/2013 | Ferrari et al. |
| 8,407,907 B2 | 4/2013 | Tait |
| 8,429,828 B2 | 4/2013 | Ferrari |
| 8,438,747 B2 | 5/2013 | Ferrari |
| 8,453,338 B2 | 6/2013 | Ferrari |
| D687,322 S | 8/2013 | Ferrari et al. |
| 8,533,967 B2 | 9/2013 | Bailey et al. |
| 8,537,374 B2 | 9/2013 | Briggs et al. |
| 8,572,858 B2 | 11/2013 | Raab et al. |
| 8,630,314 B2 | 1/2014 | York |
| 8,683,709 B2 | 4/2014 | York |
| 8,701,299 B2 | 4/2014 | Tait |
| 8,707,572 B2 | 4/2014 | Desforges et al. |
| 8,763,267 B2 | 7/2014 | Duportal et al. |
| 8,792,709 B2 | 7/2014 | Pulla et al. |
| 8,832,954 B2 | 9/2014 | Atwell et al. |
| 8,844,151 B2 | 9/2014 | Ferrari et al. |
| 8,848,203 B2 | 9/2014 | Bridges et al. |
| 8,898,919 B2 | 12/2014 | Bridges et al. |
| 8,942,940 B2 | 1/2015 | York |
| 8,955,229 B2 | 2/2015 | Ferrari |
| 8,970,823 B2 | 3/2015 | Heidemann et al. |
| 9,036,134 B2 | 5/2015 | Steffey et al. |
| 9,041,914 B2 | 5/2015 | Tohme et al. |
| 9,046,360 B2 | 6/2015 | Atwell et al. |
| 9,069,355 B2 | 6/2015 | Tait et al. |
| 9,071,209 B1 * | 6/2015 | Harrison ............ G01R 19/0061 |
| 9,091,529 B2 | 7/2015 | Bridges et al. |
| 9,113,154 B2 | 8/2015 | Bridges et al. |
| 9,115,986 B2 | 8/2015 | Heidemann et al. |
| 9,151,830 B2 | 10/2015 | Bridges |
| 9,163,921 B2 | 10/2015 | Tait et al. |
| 9,163,922 B2 | 10/2015 | Bridges et al. |
| 9,170,098 B2 | 10/2015 | Gong et al. |
| 9,188,430 B2 | 11/2015 | Atwell et al. |
| 9,207,309 B2 | 12/2015 | Bridges |
| 9,217,637 B2 | 12/2015 | Geidemann et al. |
| 9,228,816 B2 | 1/2016 | Grau |
| 9,245,346 B2 | 1/2016 | Bartmann et al. |
| 9,250,214 B2 | 2/2016 | Ferrari et al. |
| 9,342,890 B2 | 5/2016 | Becker et al. |
| 9,360,290 B2 | 6/2016 | Tait |
| 9,360,291 B2 | 6/2016 | Desforges et al. |
| 9,360,301 B2 | 6/2016 | Bridges et al. |
| 9,417,317 B2 | 8/2016 | Bridges et al. |
| 9,448,059 B2 | 9/2016 | Bridges et al. |
| 9,453,717 B2 | 9/2016 | Bridges |
| 9,482,514 B2 | 11/2016 | Bridges |
| 9,482,529 B2 | 11/2016 | Becker et al. |
| 9,494,412 B2 | 11/2016 | Tohme et al. |
| 9,551,558 B2 | 1/2017 | Ferrari et al. |
| 9,594,250 B2 | 3/2017 | Tait et al. |
| 9,599,455 B2 | 3/2017 | Heidemann et al. |
| 9,602,811 B2 | 3/2017 | Hillebrand et al. |
| 9,607,239 B2 | 3/2017 | Bridges et al. |
| 9,618,330 B2 | 4/2017 | Ferrari |
| 9,628,775 B2 | 4/2017 | Bridges et al. |
| 9,656,390 B2 | 5/2017 | Telling |
| 9,671,221 B2 | 6/2017 | Ruhland et al. |
| 9,678,211 B2 | 6/2017 | Ossig et al. |
| 9,686,532 B2 | 6/2017 | Tohme |
| 9,693,040 B2 | 6/2017 | Hillebrand et al. |
| 9,696,129 B2 | 7/2017 | Tait |
| 9,734,609 B2 | 8/2017 | Pulla et al. |
| 9,746,560 B2 | 8/2017 | Steffey et al. |
| 9,759,540 B2 | 9/2017 | Ferrari et al. |
| 9,769,463 B2 | 9/2017 | Hillebrand et al. |
| 9,772,173 B2 | 9/2017 | Atwell et al. |
| 9,803,967 B2 | 10/2017 | Tait et al. |
| 9,858,682 B2 | 1/2018 | Heidemann et al. |
| 9,879,975 B2 | 1/2018 | Hillebrand et al. |
| 9,879,976 B2 | 1/2018 | Bridges et al. |
| 9,879,983 B2 | 1/2018 | Kaufman et al. |
| 9,909,855 B2 | 3/2018 | Becker et al. |
| 9,910,126 B2 | 3/2018 | Bridges et al. |
| 9,915,521 B2 | 3/2018 | Hillebrand et al. |
| 9,964,398 B2 | 5/2018 | Becker et al. |
| 9,964,402 B2 | 5/2018 | Tohme et al. |
| 9,967,545 B2 | 5/2018 | Tohme |
| 9,989,348 B2 | 6/2018 | Desforges et al. |
| 9,989,357 B2 | 6/2018 | Heidemann et al. |
| 10,021,379 B2 | 7/2018 | Bridges |
| 10,036,627 B2 | 7/2018 | Ferrari et al. |
| 10,060,722 B2 | 8/2018 | Bridges et al. |
| 10,070,116 B2 | 9/2018 | Hillebrand et al. |
| 10,088,296 B2 | 10/2018 | Hillebrand et al. |
| 10,089,415 B2 | 10/2018 | Grau |
| 10,089,789 B2 | 10/2018 | Tohme et al. |
| 10,108,829 B2 | 10/2018 | Telling |
| 10,109,033 B2 | 10/2018 | Becker et al. |
| 10,119,805 B2 | 11/2018 | Becker et al. |
| 10,126,116 B2 | 11/2018 | Becker et al. |
| 2003/0167647 A1 | 9/2003 | Raab et al. |
| 2004/0154402 A1 | 8/2004 | Drake, Jr. |
| 2005/0266396 A1 * | 12/2005 | Publicover ............ G01N 33/536 435/4 |
| 2009/0243532 A1 | 10/2009 | Eaton |
| 2009/0296105 A1 | 12/2009 | Ferrari et al. |
| 2011/0112786 A1 | 5/2011 | Desforgets et al. |
| 2011/0213247 A1 | 9/2011 | Shammas |
| 2012/0047756 A1 | 3/2012 | Ferrari |
| 2012/0191409 A1 | 7/2012 | Tait et al. |
| 2015/0355310 A1 | 12/2015 | Gong et al. |
| 2016/0041052 A1 * | 2/2016 | Fogarty ................. G01N 33/24 73/744 |
| 2016/0084633 A1 | 3/2016 | Ferrari et al. |

(56) References Cited

U.S. PATENT DOCUMENTS

| | | |
|---|---|---|
| 2016/0093099 A1 | 3/2016 | Bridges |
| 2016/0129594 A1 | 5/2016 | Telling |
| 2016/0349746 A1 | 12/2016 | Grau |
| 2016/0364874 A1 | 12/2016 | Tohme et al. |
| 2016/0370171 A1 | 12/2016 | Bridges |
| 2016/0377410 A1 | 12/2016 | Becker et al. |
| 2017/0054965 A1 | 2/2017 | Raab et al. |
| 2017/0094251 A1 | 3/2017 | Wolke et al. |
| 2017/0186183 A1 | 6/2017 | Armstrong et al. |
| 2017/0188015 A1 | 6/2017 | Heidemann et al. |
| 2017/0241768 A1 | 8/2017 | Tait et al. |
| 2017/0248408 A1 | 8/2017 | Ferrari |
| 2017/0249488 A1 | 8/2017 | Telling |
| 2017/0276472 A1 | 9/2017 | Becker et al. |
| 2017/0332069 A1 | 11/2017 | Hillebrand et al. |
| 2017/0343673 A1 | 11/2017 | Steffey et al. |
| 2018/0023935 A1 | 1/2018 | Atwell et al. |
| 2018/0063510 A1 | 3/2018 | Wolke et al. |
| 2018/0071914 A1 | 3/2018 | Heidemann et al. |
| 2018/0073850 A1 | 3/2018 | Ferrari et al. |
| 2018/0088202 A1 | 3/2018 | Raab et al. |
| 2018/0088203 A1 | 3/2018 | Raab et al. |
| 2018/0149469 A1 | 5/2018 | Becker et al. |
| 2018/0164090 A1 | 6/2018 | Hillebrand et al. |
| 2018/0172428 A1 | 6/2018 | Bridges et al. |
| 2018/0196116 A1 | 7/2018 | Bridges et al. |
| 2018/0211361 A1 | 7/2018 | Becker et al. |
| 2018/0224270 A1 | 8/2018 | Wolke et al. |
| 2018/0238681 A1 | 8/2018 | Tohme et al. |
| 2018/0240241 A1 | 8/2018 | Armstrong et al. |
| 2018/0274910 A1 | 9/2018 | Heidemann et al. |
| 2018/0285482 A1 | 10/2018 | Santos et al. |
| 2018/0321383 A1 | 11/2018 | Heidemann et al. |
| 2018/0336690 A1 | 11/2018 | Becker et al. |
| 2018/0364033 A1 | 12/2018 | Doring et al. |
| 2019/0033064 A1 | 1/2019 | Becker et al. |
| 2019/0035053 A1 | 1/2019 | Becker et al. |

FOREIGN PATENT DOCUMENTS

| | | |
|---|---|---|
| WO | WO 93/05479 | 3/1993 |
| WO | WO 2005/100908 | 10/2005 |
| WO | WO 2007/039278 | 4/2007 |
| WO | WO 2007/125081 | 11/2007 |
| WO | WO 2008/113783 | 9/2008 |

OTHER PUBLICATIONS

PCT Invitation to Pay Additional Fees dated Feb. 20, 2019, International Application No. PCT/US2018/060664, 15 pages.

Laser Design: "FAROARM 3D Laser Scanners," 2 pages, (http://www.dirdim.com/pdfs/ddi_ldi_slp_laser_scanner.pdf), believed to have published before Sep. 28, 2017.

Horic et al., "Remote Force Control of Robot Using PHANToM Haptic Model of Force Sensor," May 28-29, 2001; 8 pages.

\* cited by examiner

THERMAL MANAGEMENT OF AN OPTICAL SCANNING DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present invention relates to optical scanning devices such as optical devices for the measurement of geometric coordinates.

Description of the Related Art

Optical scanning devices typically include optical sensors that collect visual data to determine geometric coordinates on an object. For example, the scanning device might include two optical sensors whose views overlap. The data from the two sensors can then be compared to determine the coordinates of points within the overlapping region. The optical scanning device can also include a light source such as a laser or a projector. The light source can emit a pattern of light onto an object being measured, such as a line, point cloud, or other pattern. The pattern can then facilitate the identification of corresponding points between the two images, for example using triangulation. Other techniques for determining coordinates are also possible. For example, two optical sensors can operate without a light source, a single optical sensor can operate with a light source, and more than two cameras can operate with or without a light source.

The optical scanning devices can be used independently, or with another device that assists with determining a location of the optical scanning device. For example, the optical scanning device can be mounted on an articulated arm coordinate measurement machine or its location can be tracked using a laser tracking device and a retroreflector mounted on the optical scanning device. Examples of such systems are described, for example, in U.S. Patent Publication No. 2016/0084633, which is incorporated herein by reference in its entirety.

SUMMARY

In one embodiment, a handheld optical scanning device for measuring coordinate data includes a projector, one or more cameras, a temperature sensor, a fan, and a processor. The projector can be configured to illuminate a portion of an object to be measured with a pattern of light, and one or more cameras can be configured to capture images of the portion of the object illuminated by the projector. The temperature sensor can be configured to measure a temperature of the handheld optical scanning device at one or more positions. The processor can be in communication with the temperature sensor and the fan and be configured to control the fan based at least on data from the temperature sensor.

In a further embodiment, a method of controlling the temperature of a handheld optical scanning device can be provided. The optical scanning device can be configured to measure geometric coordinates on an object using a projector to illuminate a portion of the object to be measured with a pattern of light and one or more cameras to capture images of the portion of the object illuminated by the projector. The temperature of the handheld optical scanning device can be measured at one or more positions. The fan can then be operated at least according to the measured temperature to maintain a substantially consistent temperature of the handheld optical scanning device.

In a further embodiment, a handheld optical scanning device for measuring coordinate data can include a projector, one or more cameras, and at least one heat pipe. The projector can be configured to illuminate a portion of an object to be measured with a pattern of light. The one or more cameras configured to capture images of the portion of the object can be illuminated by the projector. The at least one heat pipe can thermally connect at least one of the projector and the one or more cameras to the at least one heat exchanger. The at least one heat pipe can include a fluid that evaporates to transfer heat from a heat source to the heat exchanger and condenses back to a fluid at the heat exchanger.

In a further embodiment, a method of controlling the measurement of coordinate data by an optical scanning device according to a thermal status of the optical scanning device is provided. A temperature of the handheld optical scanning device can be regularly measured at one or more positions. The use of the optical scanning device to measure coordinate data can be prevented when the optical scanning device is substantially outside of thermal equilibrium, as indicated by the measured temperature. The optical scanning device can be allowed to measure coordinate data when the optical scanning device is substantially within thermal equilibrium, as indicated by the measured temperature.

In a further embodiment, the use of an optical scanning device to measure coordinate data can be prevented for a predetermined period of time after the optical scanning device has been powered-on and is otherwise ready to measure coordinate data.

In a further embodiment, a method of measuring coordinate data using a handheld optical scanning device and adjusting the measured coordinate data to compensate for temperature fluctuations is provided. A pattern of light can be projected onto an object to be measured with a projector on the handheld optical scanning device. The object having the pattern of light can be imaged with one or more cameras on the handheld optical scanning device. Further, a temperature of the handheld optical scanning device can be measured at one or more positions on the handheld optical scanning device. Geometric coordinates on the object can be determined based at least on images from the one or more cameras and the measured temperature.

In a further embodiment, an optical scanning system can include a handheld optical scanning device and a warming cradle. The handheld optical scanning device can include a projector, one or more cameras, and a mounting section. The projector can be configured to illuminate a portion of an object to be measured with a pattern of light. The one or more cameras can be configured to capture images of the portion of the object illuminated by the projector. The warming cradle can also include a mounting section, configured to form an electrical and physical connection with the mounting section of the handheld optical scanning device and to provide electrical power and data transfer capabilities to the handheld optical scanning device. The optical scanning device can also be configured to raise its temperature to a temperature above ambient temperature while connected to the warming cradle.

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION

Figure 1A:
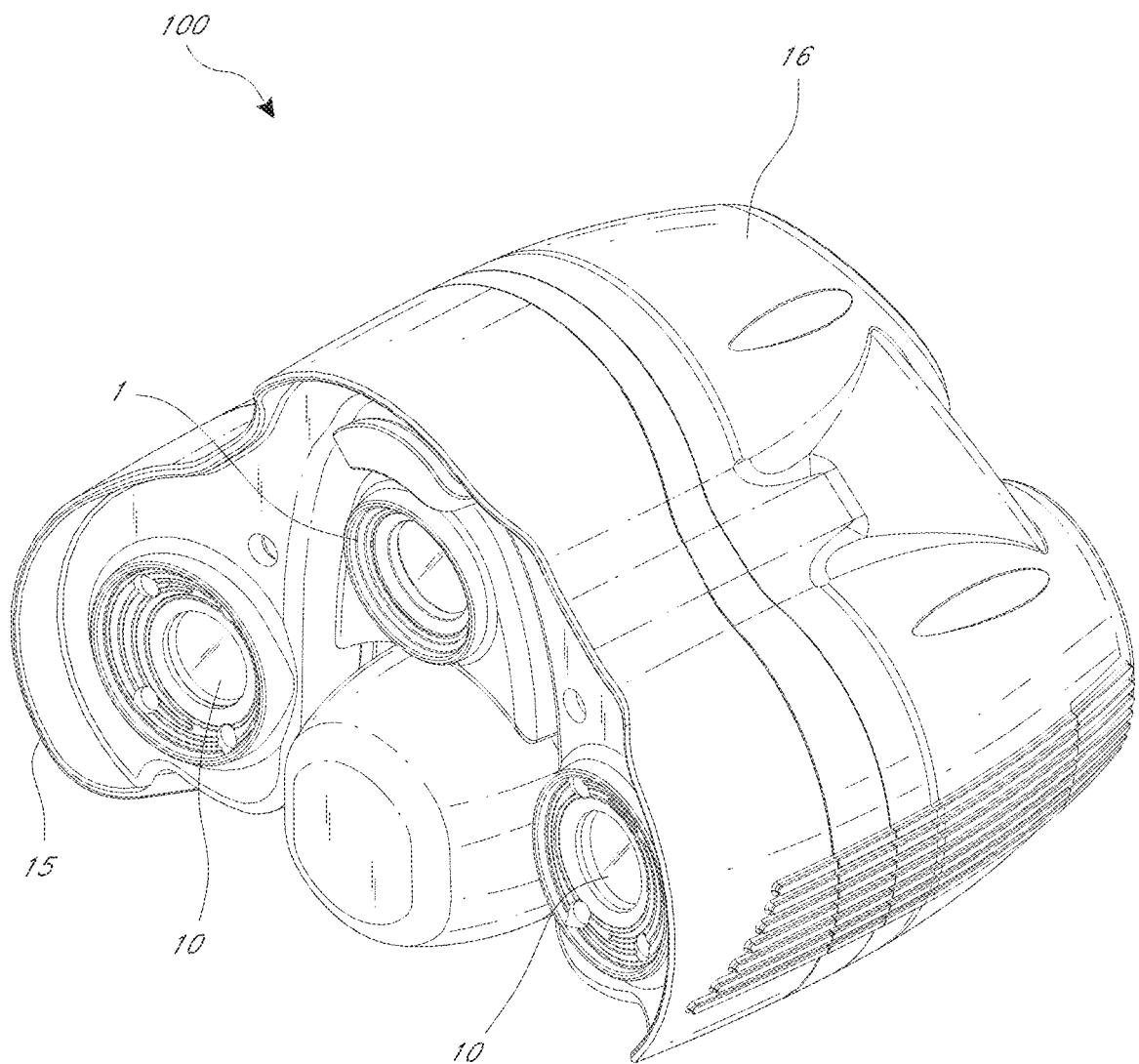
FIGS. 1A and 1B are front and rear perspective views of an optical scanning device.
Figure 1B:
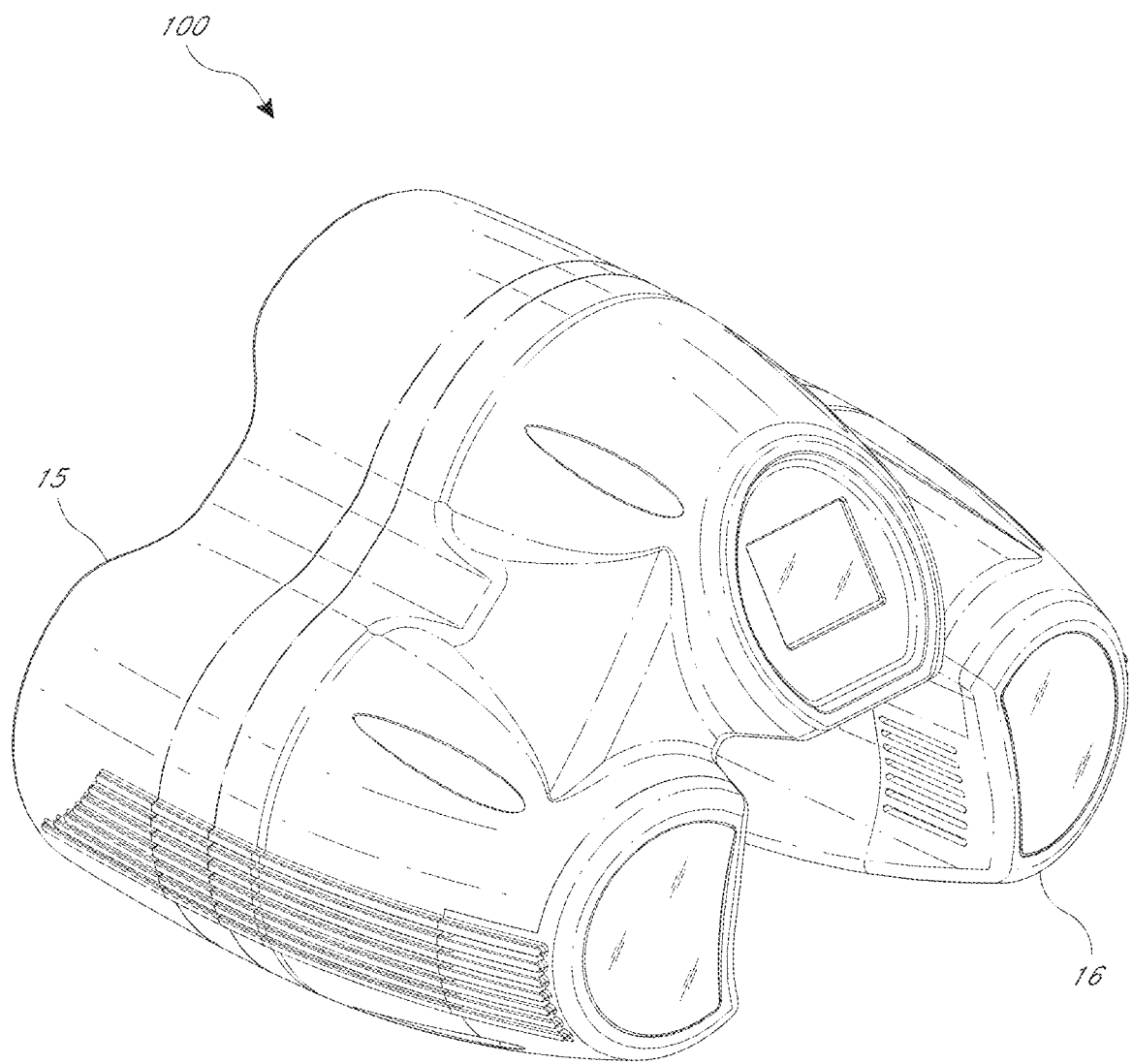

The optical scanning device 100 is depicted in FIGS. 1A and 1B as a handheld device with a housing including a face plate 15 and a rear cover 16. The housing can be formed of a variety of materials, such as a plastic, ceramic, composite (such as a carbon fiber material), or a metal (such as steel or aluminum). The material can optionally be chosen to have a low coefficient of thermal expansion, such that the device does not significantly change shape with minor temperature variations during normal use. Nevertheless, even the slightest temperature changes can cause changes to the optical scanning device 100, such as a thermal expansion of components that increases or decreases the distance between measuring elements on the device. Thus, the materials can be chosen to allow the device to maintain a high measurement accuracy (for example, with errors no greater than 0.5 mm) under normal temperature changes.

Figure 3:
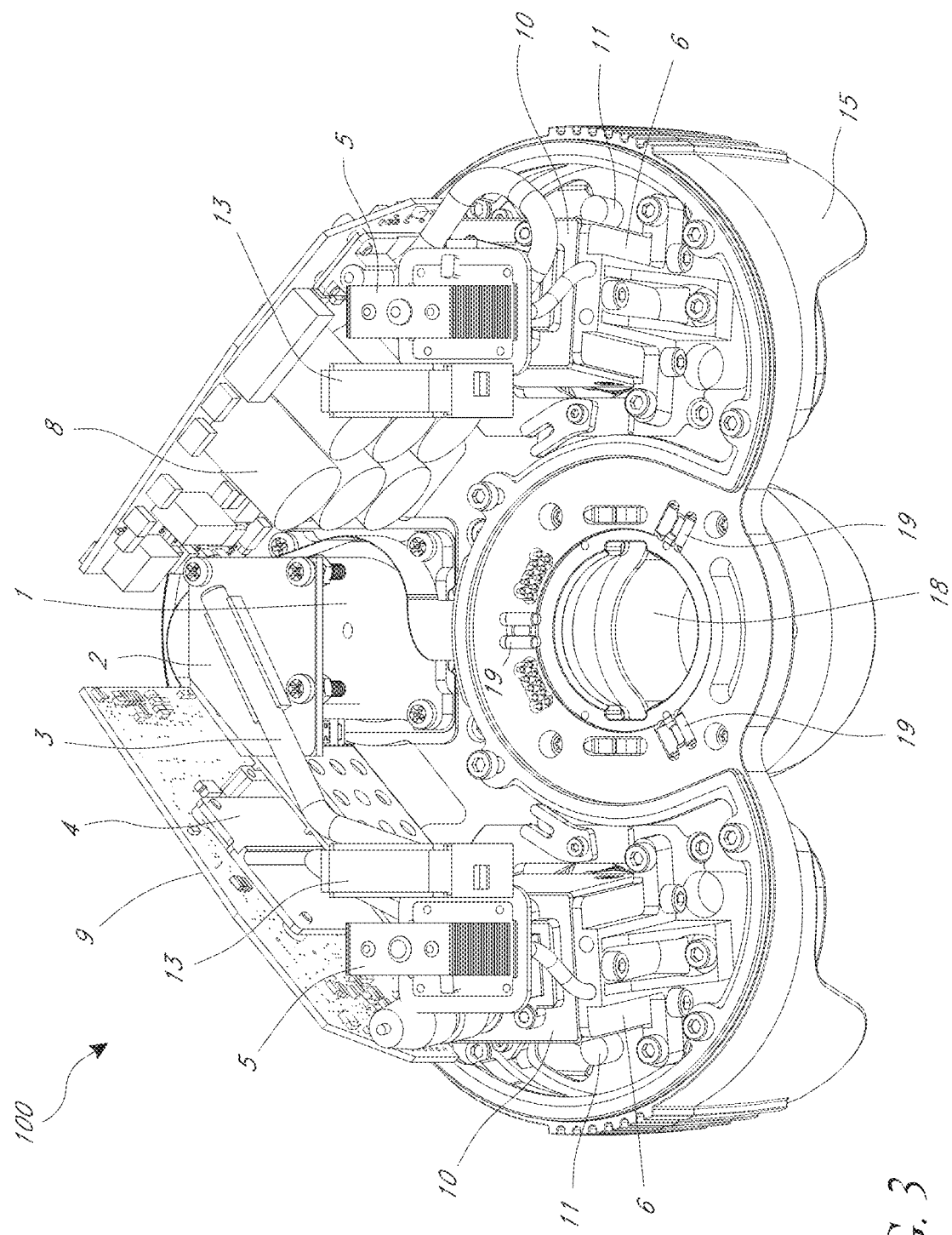
FIG. 3 is a rear perspective view of the optical scanning device of FIGS. 1A and 1B, with a rear portion of the housing removed.
Figure 4:
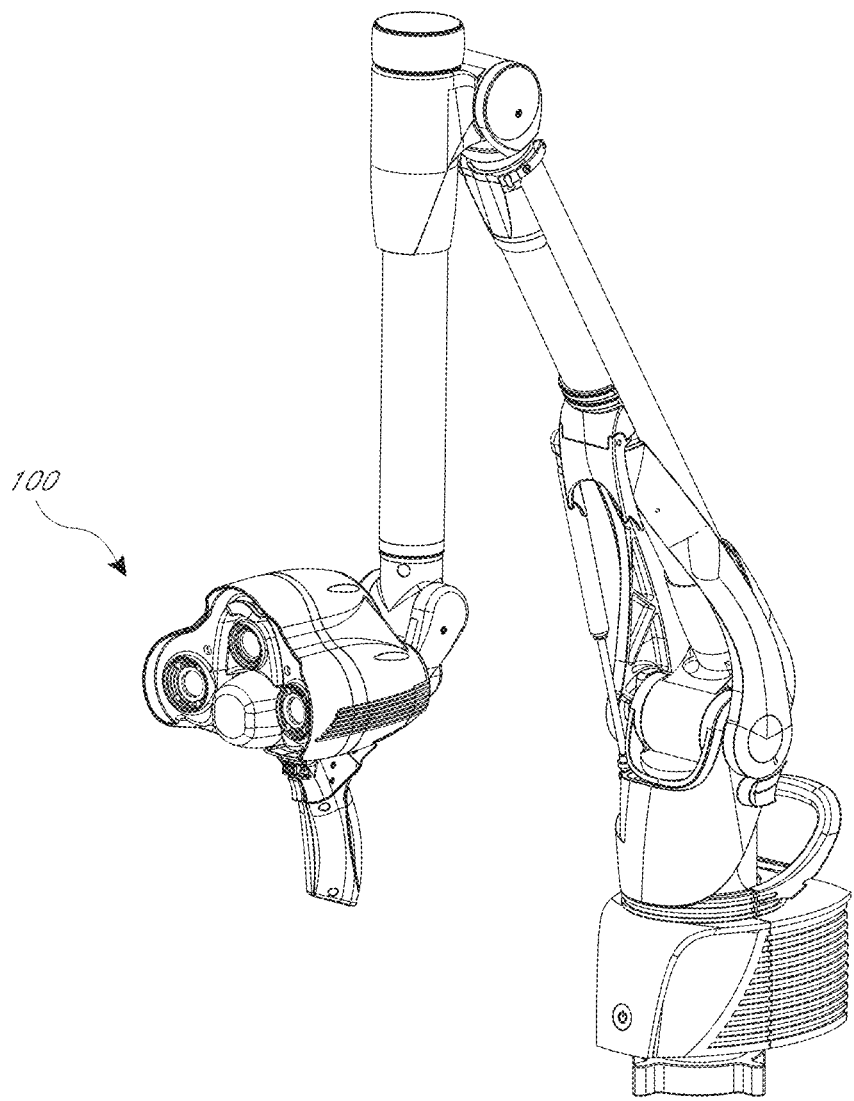
FIG. 4 depicts the optical scanning device of FIGS. 1A and 1B mounted on an articulated arm coordinate measuring machine.

The optical scanning device 100 can also include a mounting section 18 configured to mount the device to a metrology device such as an articulated arm coordinate measuring machine or a laser tracking device (for example, a retroreflector used with a laser tracking device) that can measure a position of the scanning device, to a handle (for example, when the optical scanning device will be used independently) such as a pistol grip handle, to a warming cradle 50, or to other items. As depicted in FIG. 3, the mounting section 18 includes a hole that can receive a contact probe of an articulated arm coordinate measuring machine passing through the hole. Thus, the optical scanning device 100 can be used alongside the contact probe while mounted on the arm. The hole can also optionally receive a retroreflector, an arm without a contact probe, or other devices. FIG. 4 depicts the optical scanning device 100 mounted to an end of an articulated arm coordinate measuring machine and having a pistol grip.

As best depicted in FIG. 3, the mounting section 18 can also include three sets of pins 19 arranged about the hole. The pins 19 can interact with similarly sized slots on an articulated arm coordinate measuring machine, retroreflecting device, or another device to form a kinematic mount that has a consistent position. Thus, calibration of the optical device 100 with each device it can mount to can be done once, with the relative position/orientation between the devices being consistent each time they are attached. As shown, the three sets of pins 19 can be equally radially spaced around the hole. However, in other embodiments they can be arranged differently, include other shapes, or have a different number than that shown in the figures.

The optical scanning device 100 can attach to a metrology device (and be removed) by an operator by hand or with tools. For example, the optical scanning device 100 can be urged against a metrology device such that the pins 19 form a kinematic engagement with corresponding structures on the metrology device. The attachment can be secured using snap-fits, threaded mounts, hand-operated locks, and other attachments. Thus, the optical scanning device 100 can be securely mounted at a consistent position. Similar attachment mechanisms can also be used at other locations on the optical scanning device 100. For example, in some embodiments the device 100 can include features for attachment on a bottom of the device in addition to the mounting section 18.

The optical scanning device 100 can also include an electrical interface for allowing data transfer, power transfer, or both data and power transfer, such as with an USB connection. In the depicted embodiment, the electrical interface can be provided through the mounting section 18, such that the electrical interface can also easily meet a similar interface on an articulated arm coordinate measuring machine or other device when mounted thereto.

On a front side of the optical scanning device 100 can be one or more optical sensors 10, and one or more light sources 1 (such as a projector). For example, in some embodiments there can be one optical sensor and one light source, two optical sensors (and no light source), two optical sensors and one light source (as shown in the figures), or other combinations. When there are more than two optical sensors and light sources, they can be arranged non-collinearly. Further, as shown, they can optionally be arranged on generally opposite sides of the mounting section 18. In such an arrangement, the weight of the optical scanning device 100 can optionally be substantially balanced around the mounting section 18, which can also serve as a center of rotation in some circumstances. Thus, the optical scanning device 100 can be easily maneuvered by hand. Further, bringing the components closer to the mounting section 18 can reduce a rotational volume of the optical scanning device 100, such that it can more easily reach into small spaces.

The optical scanning device 100 can additionally include a processor 9 mounted on the optical scanning device 100. The processor 9 can also optionally be included separate from the optical scanning device 100, such as on a separate computing device in communication with the optical scanning device over a wired or wireless data connection. The processor can also optionally include multiple components, some on the scanning device 100 and some separate from the device. The processor 9 can operate the light source 1 and collect data from the optical sensors 10 to determine geometric coordinates of an object viewed by the optical sensors and illuminated by the light sources. For example, the light source 1 might illuminate the object with a line, a point cloud, or some other pattern such as a structured light pattern. The optical sensors 10 can then collect one or more images of the object (with the illumination) and the processor 9 can use those images to determine geometric coordinates on the object relative to the optical scanning device 100. These geometric coordinates can be determined using triangulation methods (for example, with multiple sensors at different locations). More specifically, in an embodiment with a two optical sensors 10, the processor 9 can identify a point present in images provided by both optical sensors. The position of that point in the images can indicate an angle relative to each sensor 10 at which the point is located, relative to each optical sensor. If the location and orientation of each optical sensor 10 relative to each other is known, then the precise location (angle and distance) of the point relative to the optical sensors can be determined. In some embodiments, that point can be a point of illumination produced by the light source 1.

As discussed above, temperature changes on the optical scanning device 100 can cause various components to expand or contract, changing the distance between the optical sensors 10. The expansion and contraction can also change the orientation of the optical sensors 10 relative to each other as their angles can shift, especially when one portion of the device has expanded or contracted more than another. Measurements of a three-dimensional location on an object can be extremely sensitive to the relative angles and distances of the optical sensors 10. Thus, a small change in size and shape caused by temperature variation is magnified when used to compute a position measured by the optical scanning device 100.

After measurement of the geometric coordinates by the optical scanning device 100 (with a position relative to the optical scanning device), these geometric coordinates can then be translated into a stationary coordinate system by the processor 9, using a determined location and orientation of the optical scanning device 100 itself for example, measured with an articulated arm coordinate measuring machine or a laser tracker. In other embodiments, the location and orientation of the optical scanning device 100 within the stationary coordinate system can be determined using the same geometric coordinates it measures. For example, if the device 100 measures an area that includes one or more pre-measured markers with a known position, then the device's position relative to the markers is known. Similarly, if the device 100 measures an area that overlaps with a previously measured area (taken while the device was in a different position), the device can compare the two sets of measurements in the overlapping area to determine its position and orientation relative to the previous measurements (using the previous measurements in a manner similar to pre-measured markers).

The optical scanning device 100 can additionally include other electronic components for independent operation, such as batteries, a memory, wired or wireless communication devices, displays, and other features. In some embodiments, some or all of these additional electronic components can be included on a separate handle, to be used when the optical scanning device 100 is used independently from other metrology devices such as an articulated arm coordinate measuring machine.

Figure 2:
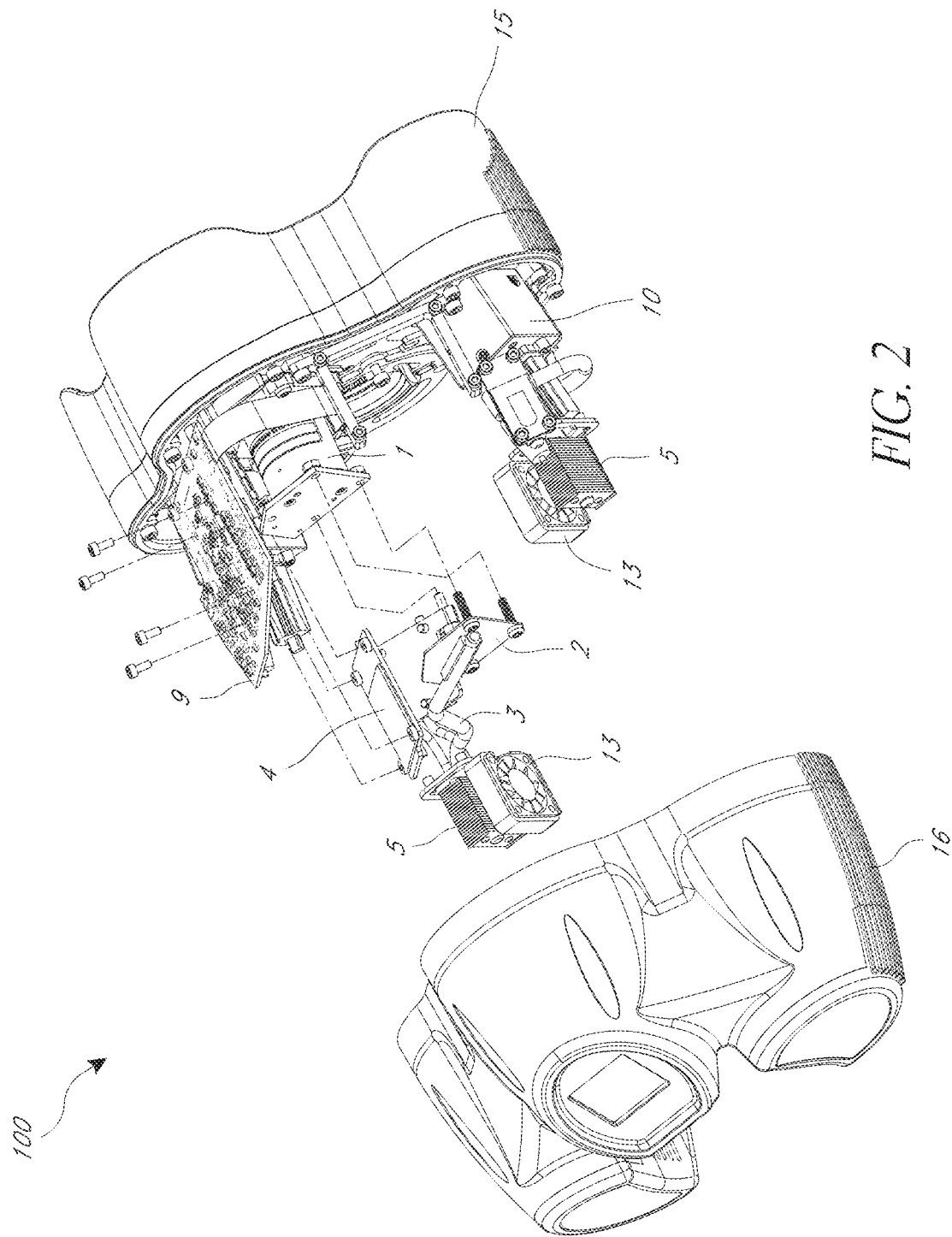
FIG. 2 is an exploded view of the optical scanning device of FIGS. 1A and 1B.

As shown in FIGS. 2 and 3, the components of the optical scanning device 100 can be mounted to a housing, such as to a face plate 15 of the housing or another part of the housing such as the rear cover 16. The depicted components include a light source 1 (such as a projector or a laser) with a corresponding heat spreader plate 2 in thermal contact with the light source. The heat spreader plate 2 associated with the light source 1 is also thermally connected to a heat pipe 3, which is positioned to conduct heat from the light source/plate to a heat exchanger 5. A processor 9 is also depicted, and in thermal contact with another heat spreader plate 4, which can also be thermally connected to the heat exchanger 5 through a heat pipe. A power board 8 (including batteries for the device 100) is also depicted, and can also optionally be connected to a heat exchanger 5 through a heat spreader plate 7 and a heat pipe. Each heat exchanger 5 can be associated with an optical sensor 10 (such as a camera) mounted to a bracket 6, such that each optical sensor 10 is also thermally connected to the heat exchangers 5.

As shown, the light source 1 and the processor 9 are connected to one heat exchanger 5, while the power board 8 is connected to another heat exchanger. Further, each of the heat exchangers 5 are associated with (for example, adjacent to and in contact with) an optical sensor 10, and are positioned symmetrically on the scanning device 100. This can substantially balance the thermal load on each heat exchanger, such that a temperature distribution on the optical scanning device 1 can remain substantially even, and heat can be dissipated more efficiently. However, in other embodiments this arrangement can vary. For example, in some embodiments more than two heat exchangers can be provided, the light source 1 and the processor 9 can be connected to the different heat exchangers, the optical sensors 10 can be non-adjacent the heat exchangers 5, and other variations.

The heat pipes 3 can include a liquid that can evaporate at a heat source (such as the light source 1, processor 9, or power board 8; or their corresponding heat spreader plates 2, 4). The evaporated gas can then migrate to the heat exchanger where it can condense back to a liquid, releasing heat. The condensed liquid can then flow back to the heat source.

Figure 5:
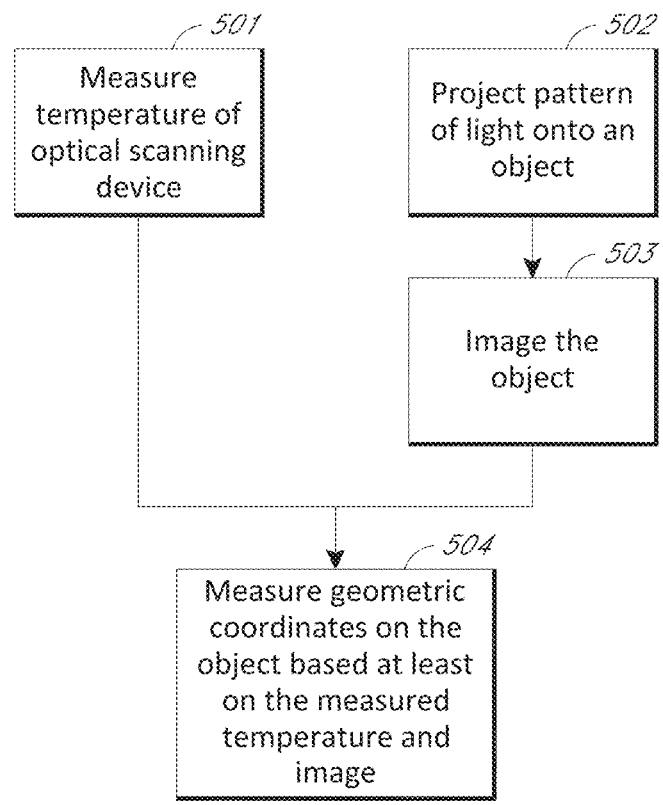
FIG. 5 depicts an algorithm for measuring geometric coordinates based on measured temperature.

The optical scanning device can additionally include one or more temperature sensors 11 that can be used to determine the temperature of the optical scanning device 1 at locations sufficiently distant to indicate spatial temperature variations on the scanning device 100. As depicted, four temperature sensors 11 are included: two at opposite ends of the device, and two substantially, centrally, and symmetrically located (on opposite sides of the mounting section 18, and occluded from view by other components in FIG. 3). However, additional temperature sensors can also be used, such as on the light source 1 and each optical sensor 10 (for example, resulting in seven temperature sensors). In some embodiments, the temperature data can be used to adjust the coordinate data generated by the optical scanning device 100 to compensate for variations caused by thermal fluctuations, as depicted for example in FIG. 5. As described in more detail above, a pattern of light can be projected onto an object (502) and an image of the object and the pattern can be collected (503). The temperature of the scanning device 100 can also be measured (501). The temperature and the image can then be used to measure geometric coordinates (504). This process can use calibration data generated using the device while taking measurements at a variety of temperatures (including, for example, at a substantially similar temperature such that the effect on the device would be approximately the same), or using estimates of the effects of temperature variations on the measured data and a model of the optical scanning device 100 under thermal expansion/contraction. This information can indicate how the specific types of temperature variation effect the measured coordinates. The temperature data can also optionally be stored (along with the coordinate data) such that the data can be analyzed at a later time to potentially flag (or correct) coordinate data that may be compromised due to temperature fluctuations, using more complex algorithms.

Figure 6:
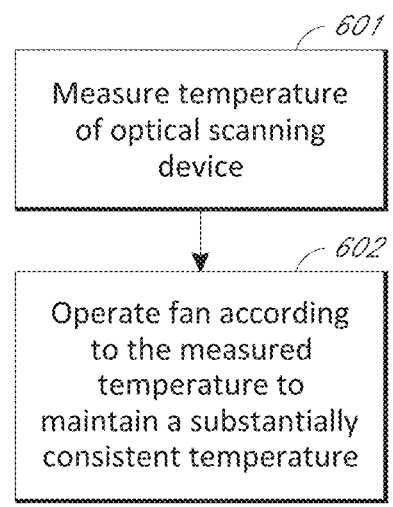
FIG. 6 depicts an algorithm for operating a fan according to measured temperature.

The temperature sensors 11 can also be used to operate one or more fans 13 disposed on the optical scanning device 100. The fans 13 can be located substantially adjacent the heat exchangers 5, to accelerate the exchange of heat from the exchangers to the ambient air. The fans 13 can also be arranged axially and urge air flow axially and rearwardly from the optical scanning device 100, through the heat exchangers 5, and out of the optical scanning device (receiving and expelling air toward the rear of the device). The temperature sensors 11 can measure the temperature of the optical scanning device 100 (601) and provide data to the processor 9, and the processor can then use at least this data to control the fans 13, for example using a proportional-integral-derivative control system, to maintain a substantially consistent, desired temperature (602), as depicted in FIG. 6. The multiple temperature sensors 11 can also be used to control multiple fans 13 individually. For example, if there are two fans 13 on opposite sides of the scanning device 100, and the temperature sensors indicate that one side of the device is warmer than the other side of the device, than the fan on the warmer side can be activated to provide more cooling than the fan on the cooler side of the device. This can help reduce changes in the angle of the optical sensors 10 relative to each other caused by spatially uneven temperatures.

Due to the varying ambient temperatures the optical scanning device 100 could potentially be used in, the device can also be capable of operating at a variety of different temperatures. Thermal output from the electronic components can warm-up the device 100, and the fans 13 can potentially cool the device, but these might not be sufficient to hold the device at a particular temperature in all ambient temperatures. Thus, as discussed above, the device can be configured to use temperature data to adjust for any variations in the coordinate data caused by temperature (such as thermal expansion of components on the optical scanning device 100).

However, it might still be desirable to only measure coordinate data when the optical scanning device 100 is substantially at a thermal equilibrium or within a prescribed temperature range. Data taken outside of a thermal equilibrium or a prescribed temperature range can be recorded as having been acquired under sub-optimal conditions, such that they can be reviewed more critically at a later time. Because heat generated by the device can be spatially distributed unevenly, data from the temperature sensors (even if located at different positions) might not fully represent the temperature distribution across the device. This can be especially true when the device is not in thermal equilibrium, such that one portion may be unstably hotter/colder than another portion. Algorithms designed to compensate for temperature during equilibrium might not be able to correct the coordinate data sufficiently under these conditions. Similarly, such algorithms might not be able to sufficiently compensate for temperature outside the prescribed range, for example because they have not been calibrated for such extreme temperatures.

Figure 7:
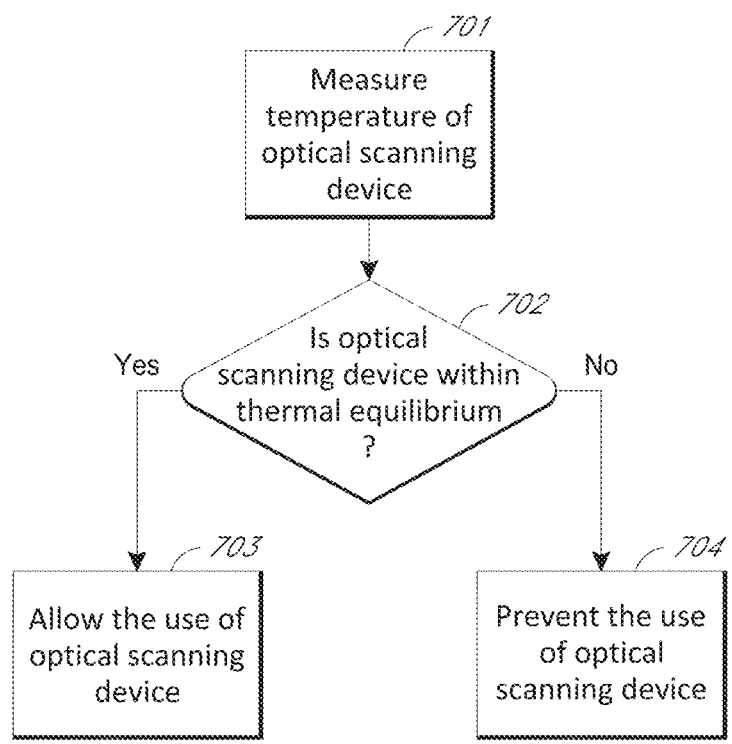
FIG. 7 depicts an algorithm for preventing the use of an optical scanning device.

Thus, in some embodiments, the optical scanning device 100 can prevent the measuring of coordinate data (or record such data with an indication that it was acquired under the sub-optimal conditions) when the optical scanning device 100 is not in thermal equilibrium or is outside a prescribed temperature range. Determination of thermal equilibrium can be accomplished by measuring the temperature (701) with the temperature sensors and analyzing the data from the temperature sensors over time, to see if there has been a significant change in temperature over a short period of time (such as, over a minute) to indicate that the device is out of thermal equilibrium (702). The temperature can be regularly measured (for example, at a rate of at least once per second, once every 5 seconds, or once per minute), and upon detecting a short-term change in temperature, the device 100 can prevent the measurement of data as discussed above (704). When the temperature data appears to have reached a substantially stable temperature over an extended period of time to indicate a thermal equilibrium has been reached (for example, when the temperature appears to remain stable for a minute, or has been observed to be converging toward a constant temperature), the device can take coordinate measurements as normal (703), as depicted in FIG. 7.

In many cases, the optical scanning device 100 will be outside of thermal equilibrium when initially turned-on or when it has not been used for an extended period of time. Thus, the device 100 can begin in a mode preventing the measurement of coordinate data (or recording the data as being acquired under such conditions), until thermal equilibrium is reached. Further, during this period of time the device 100 can be configured to activate various temperature control features to accelerate the achievement of thermal equilibrium, using the fans 13 or electronic components to cool or warm the device as desired.

Figure 8:
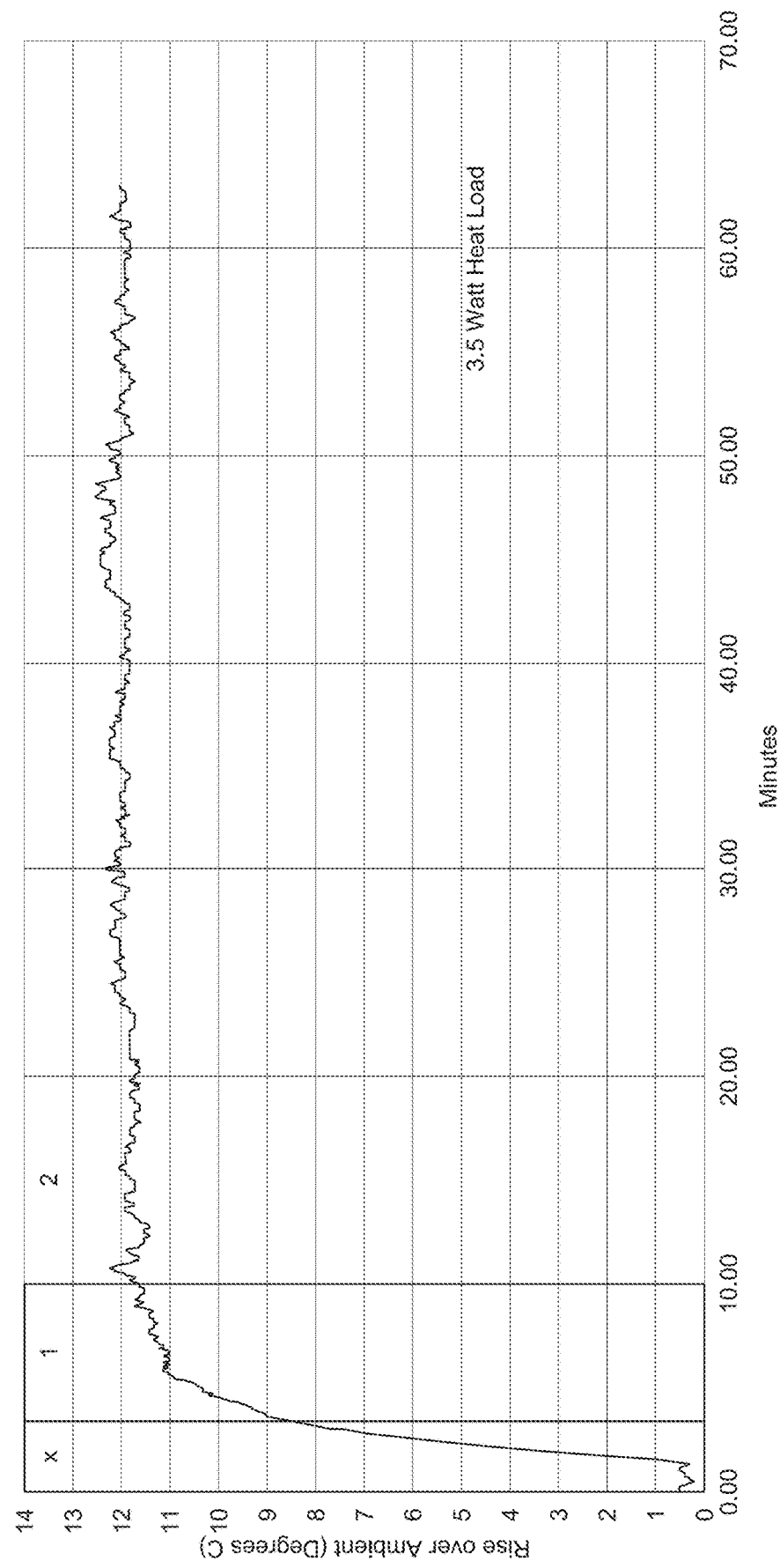
FIG. 8 is an example profile of temperature with respect to time of the optical scanning device of FIGS. 1A and 1B.

Further, in some embodiments the optical scanning device 100 can respond to extreme temperatures or a lack of thermal equilibrium in different ways depending on the degree. For example, if the device 100 is changing temperature at a slower rate (for example, less than 2 degrees Celsius per minute, less than 1 degree Celsius per minute or less than 0.5 degrees Celsius per minute) or is within a prescribed range (for example, within 2 degrees Celsius of a preferred temperature, within 5 degrees Celsius of a preferred temperature, or within 10 degrees Celsius of a preferred temperature), the device can record the measured coordinate data as having been recorded under such sub-optimal thermal conditions. Alternatively, if the device is outside the prescribed temperature range (at a more extreme temperature or changing temperature faster) the device can prevent the measurement of coordinate data. FIG. 8 depicts an example temperature profile for an optical scanning device 100 starting from time-zero when the device is turned-on. As shown, the device can initially begin warming-up rapidly as the electronics consume power and emit heat, and during this time coordinate measurement can optionally be prevented. Once the device's temperature begins to stabilize, the device can use data from the temperature sensors to attempt to compensate for temperature variations, but might also record the coordinate data as being measured under suboptimal conditions. Once the temperature appears to have stabilized, measurement can continue as normal. Even after the temperature has stabilized, data from the temperature sensors can be used to compensate for variations in temperature, as discussed above. For example, the temperature of the device 100 may continue to change if the ambient temperature changes, but such changes (for example, less than 1 degree Celsius per 15 minutes) can occur with a relatively predictable and even temperature distribution throughout the device.

The optical scanning device 100 can also optionally warn a user of the device about sub-optimal measurement conditions and initially prevent measurement during said conditions, but then can allow measurement if the user acknowledges the conditions and indicates a desire to measure the coordinates anyway. For example, in some embodiments the device 100 can include a display indicating the thermal status of the device (such as the current temperature; that the device is out of equilibrium, too hot, or too cold; or other conditions). The display can also indicate when the thermal status is outside of recommended ranges for taking coordinate measurements. A user interface device such as a button, dial, switch, or touchscreen can allow the user to bypass the warning about suboptimal conditions, and allow measurement of coordinates to be made. The display can also provide other information, such as an estimated time until the thermal status will be within recommended ranges.

Further, in some embodiments, instead of using measured temperature data to determine thermal equilibrium, the device can delay allowing the measurement of coordinate data for a predetermined period of time after the device has been powered-on and would otherwise be ready to measure coordinate data. This predetermined period of time can be based on expected time to reach thermal equilibrium, which can optionally be based on the initial temperature of the device. In some embodiments this time can be at least one minute, at least two minutes, at least five minutes, or at least ten minutes. This feature can also be applied after the device has been woken from a sleep mode, or has otherwise been in a low-power mode.

Figure 9C:
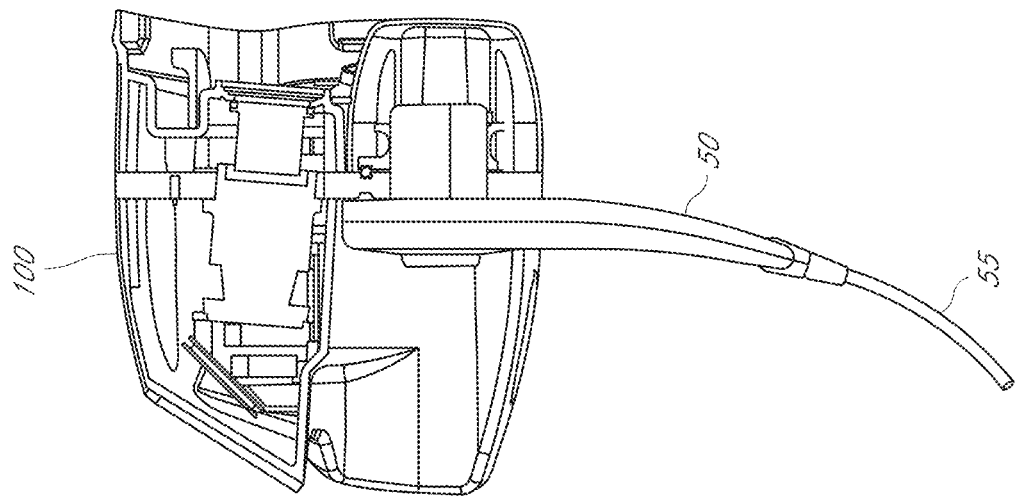
FIG. 9C is a cross-sectional view of the warming cradle of FIG. 9A receiving the optical scanning device of FIGS. 1A and 1B.
Figure 9B:
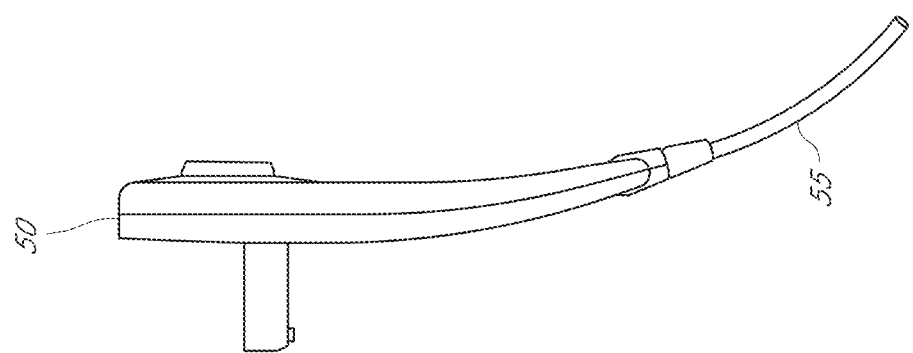
FIG. 9B is a side view of the warming cradle of FIG. 9A.
Figure 9A:
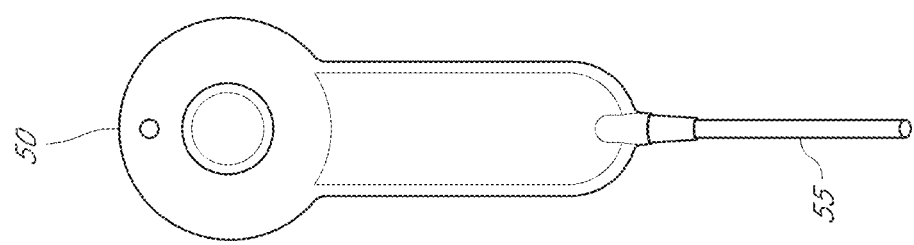
FIG. 9A is a bottom view of a warming cradle configured to receive the optical scanning device of FIGS. 1A and 1B.

The optical scanning device 100 can also be paired with other devices to help maintain a thermal status. FIGS. 9A-9C depict a warming cradle 50 that can engage with the optical scanning device 100 to maintain a thermal status of the device. As shown in FIG. 9C, the warming cradle 50 can engage with the optical scanning device 100 at the mounting section 18. The warming cradle 50 can thus form an electric connection, a thermal connection, and/or a physical connection with the optical scanning device 100. With an electric connection, the warming cradle 50 can provide electrical power and data transfer to the optical scanning device 100. The electrical power can recharge batteries on the device 100, and can also allow it to generate sufficient heat to maintain a desired temperature. The thermal connection can allow the warming cradle 50 to transfer heat (generated by the warming cradle or received from elsewhere) to the device 100 (or reverse). For example, the warming cradle 50 can be held at a desired temperature with its own heat generating or dispensing elements, such that the device 100 will tend to converge toward that temperature while connected. Similarly, the warming cradle 50 can be held at a higher or lower temperature than the desired temperature for the device 100, such that the device converges toward the desired temperature faster. The warming cradle 50 can optionally include conductive materials or radiative surfaces that can be in contact or close proximity to similarly conductive or radiative surfaces on the device 100, when mounted together, to facilitate heat transfer between the two. An additional physical connection can improve the stability of the connection between the warming cradle 50 and the optical scanning device 100, and can optionally also lift the scanning device up off of the ground, a table, or another surface while not held by a user. The warming cradle 50 can additionally include a cable 55 that can provide for electrical power, data transfer, thermal conductivity, or other features.

The optical scanning device 100 can also recognize the warming cradle 50. For example, the warming cradle can be configured to provide an electrical signal to the optical scanning device 100 indicating that it is a warming cradle (such as with a processor in the warming cradle communicating through the electrical connection with the optical scanning device). The processor on the optical scanning device 100 can then recognize that it is connected to a warming cradle instead of, for example, another metrology device. Upon recognizing this connection to a warming cradle, the optical scanning device 100 can optionally change its operating state away from a measuring operating state, for example by deactivating or reducing the activity of the light source 1 or the optical sensors 10; shifting resources in the processor 9 from data acquisition to data transfer, software updates, or other tasks; changing the information and options available on an integrated display; or other changes.

A user can optionally attach an optical scanning device 100 to a warming cradle 50 prior to use. The optical scanning device 100 can recognize this connection, and begin warming-up, recharging batteries, transferring data, and other tasks. Further, the device 100 can indicate on a display its thermal status, an estimated time until it is ready to measure coordinate data (for example, an estimated time until it is in a desired temperature range or is substantially in thermal equilibrium), or other data useful to a user. Thus, the user can remove the device 100 from the warming cradle when it is ready for use.

Many other variations on the methods and systems described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various algorithm steps described in connection with the embodiments disclosed herein can be implemented as electronic hardware, computer software, or combinations of both. To clearly illustrate this interchangeability of hardware and software, various illustrative steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative steps, components, and computing systems (such as devices, databases, interfaces, and engines) described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor can also include primarily analog components. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm, and database used in said steps, described in connection with the embodiments disclosed herein can be embodied directly in hardware, in a software module executed by a processor, or in a combination of the two. A software module, engine, and associated databases can reside in memory resources such as in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of controlling the measurement of coordinate data by an optical scanning device according to a thermal status of the optical scanning device, the method comprising:

preventing the use of the optical scanning device to measure coordinate data when the optical scanning device is substantially outside of thermal equilibrium; and allowing the optical scanning device to measure coordinate data when the optical scanning device is substantially within thermal equilibrium.

2. The method of claim 1, further comprising:

regularly measuring a temperature of the optical scanning device at one or more positions, wherein the optical scanning device being substantially outside of thermal equilibrium is determined using at least the measured temperature; and wherein the optical scanning device being substantially within thermal equilibrium is determined using at least the measured temperature.

3. The method of claim 2, further comprising displaying to a user a current thermal status of the device, based at least on the measured temperature.

4. The method of claim 3, further comprising allowing the optical scanning device to measure coordinate data after a user acknowledges the thermal status.

5. The method of claim 3, further comprising displaying to a user an estimated time until the device will substantially be within thermal equilibrium.

6. The method of claim 2, further comprising adjusting measured coordinate data based at least on the measured temperature.

7. The method of claim 2, wherein the optical scanning device is substantially within thermal equilibrium when the temperature remains stable for one minute.

8. The method of claim 1, wherein the optical device is considered to be outside of thermal equilibrium for a predetermined period of time after the optical scanning device has been powered-on or woken from a sleep mode and is otherwise ready to measure coordinate data.

9. The method of claim 8, wherein the predetermined period of time is at least one minute.

10. The method of claim 8, wherein the predetermined period of time is based at least on an expected time to reach thermal equilibrium.

11. The method of claim 8, wherein the predetermined period of time is based at least on an initial temperature of the device.

12. The method of claim 1, further comprising:

when the optical scanning device is substantially within thermal equilibrium, actuating the optical scanning device to project a pattern of light onto an object to be measured with a projector on the optical scanning device;

imaging the object having the pattern of light with one or more cameras on the optical scanning device;

measuring a temperature of the optical scanning device at one or more positions on the optical scanning device; and measuring geometric coordinates on the object based at least on images from the one or more cameras and the measured temperature.

13. The method of claim 12, wherein measuring a temperature comprises measuring a temperature of the optical scanning device at two or more positions on the optical scanning device.

14. The method of claim 13, wherein measuring a temperature comprises measuring a temperature of the optical scanning device at four or more positions on the optical scanning device.

15. The method of claim 12, further comprising storing both the coordinate data and a corresponding measured temperature.

16. The method of claim 12, wherein measuring geometric coordinates on the object is also based at least on previously measured geometric coordinates at a temperature substantially similar to the measured temperature.

17. The method of claim 1, wherein:
the optical scanning device comprises:
   a projector configured to illuminate a portion of an object to be measured with a pattern of light;
   one or more cameras configured to capture images of the portion of the object illuminated by the projector;
   a mounting section; and
   a warming cradle comprising a mounting section configured to form an electrical and physical connection with the mounting section of the optical scanning device and to provide electrical power and data transfer capabilities to the optical scanning device,
wherein the optical scanning device is configured to raise its temperature to a temperature above ambient temperature while connected to the warming cradle.

18. The method of claim 17, wherein the physical connection comprises a kinematic mount.

19. The method of claim 17, wherein the optical scanning device is configured to change its operating state away from a measuring state when connected to the warming cradle.

20. The method of claim 17, wherein the warming cradle is configured to lift the optical scanning device.

21. The method of claim 17, wherein the warming cradle forms a thermal connection with the optical scanning device to efficiently transfer heat to the optical scanning device.

22. The method of claim 1, wherein the optical scanning device is a handheld optical scanning device.

23. The method of claim 1, wherein the optical scanning device comprises a plurality of fans.

24. The method of claim 1, wherein the optical scanning device comprises:
   a projector configured to illuminate a portion of an object to be measured with a pattern of light;
   one or more cameras configured to capture images of the portion of the object illuminated by the projector;
   a temperature sensor configured to measure a temperature of the optical scanning device at one or more positions;
   a fan; and
   at least one processor in communication with the temperature sensor and the fan, the processor configured to control the fan based at least on data from the temperature sensor.

25. The method of claim 24, wherein the optical scanning device comprises a plurality of temperature sensors spaced sufficiently distant from each other to indicate spatial temperature variations on the optical scanning device.

26. The method of claim 24, wherein the at least one processor is configured to control at least two fans individually, based at least on data from at least two temperature sensors.

27. The method of claim 24, wherein the optical scanning device comprises a dustproof and waterproof enclosure.

28. The method of claim 24, further comprising at least one heat exchanger disposed such that the fan urges air flow over the heat exchanger.

29. The method of claim 28, further comprising at least one heat pipe thermally connecting at least one of a camera and the projector to the heat exchanger, the at least one heat pipe comprising a fluid that evaporates to transfer heat from a heat source to the heat exchanger and condenses back to a fluid at the heat exchanger.

30. The method of claim 24, wherein the control of the fan uses a proportional-integral-derivative control system.

31. The method of claim 24, wherein the fan urges air flow in from and out toward a rearward-facing portion of the optical scanning device.

32. The method of claim 24, further comprising a pistol grip handle.

33. The method of claim 1, comprising:
   measuring a temperature of the optical scanning device at one or more positions; and
   operating a fan at least according to the measured temperature to maintain a substantially consistent temperature of the optical scanning device.

34. The method of claim 33, wherein the optical scanning device is configured to measure geometric coordinates on an object using a projector to illuminate a portion of the object to be measured with a pattern of light and one or more cameras to capture images of the portion of the object illuminated by the projector.

35. The method of claim 33, wherein the step of measuring a temperature comprises measuring the temperature at two or more positions, and the step of operating a fan comprises operating two or more fans individually, at least according to the measured temperature at the two or more positions.

36. The method of claim 35, wherein two or more of the positions are sufficiently distant to indicate spatial temperature variations on the optical scanning device.

37. The method of claim 33, wherein the fan is operated according to a proportional-integral-derivative control system.

38. The method of claim 33, wherein the geometric coordinates are measured using triangulation.

39. The method of claim 1, wherein the optical scanning device comprises:
   a projector configured to illuminate a portion of an object to be measured with a pattern of light;
   one or more cameras configured to capture images of the portion of the object illuminated by the projector;
   one or more heat exchangers; and
   at least one heat pipe, the heat pipe thermally connecting at least one of the projector and the one or more cameras to the at least one heat exchanger, the at least one heat pipe comprising a fluid that evaporates to transfer heat from a heat source to the heat exchanger and condenses back to a fluid at the heat exchanger.

40. The optical scanning device of claim 39, the processor is thermally connected to at least one of the one or more heat exchangers by a heat pipe.

41. The optical scanning device of claim 39, further comprising two or more heat exchangers and at least two heat pipes, the heat pipes thermally connecting the projector and at least one of the one or more cameras to two separate heat exchangers.

* * * * *